United States Patent [19]
Breer et al.

[11] 3,794,451
[45] Feb. 26, 1974

[54] INTRODUCTION OF REACTANTS INTO MOULDS

[75] Inventors: Karl Breer, Cologne; Klaus Schulte, Leverkusen, both of Germany

[73] Assignee: Bayer Aktiengesellschaft, Leverkusen, Germany

[22] Filed: June 21, 1971

[21] Appl. No.: 155,086

[30] Foreign Application Priority Data
June 26, 1970 Germany............................ 2031737

[52] U.S. Cl.................. 425/4, 425/130, 425/244, 425/247
[51] Int. Cl............................................ B29d 27/02
[58] Field of Search ....... 425/4, 242, 244, 247, 251, 425/245, 252, 130, 146; 259/4; 222/145; 156/500

[56] References Cited
UNITED STATES PATENTS

| | | | |
|---|---|---|---|
| 3,328,836 | 7/1967 | Axelsson | 425/129 X |
| 2,426,651 | 9/1947 | Stacy | 425/207 X |
| 2,431,349 | 11/1947 | Stacy | 425/247 X |
| 3,494,999 | 2/1970 | Heckrotte | 425/4 X |
| 2,862,239 | 12/1958 | Pollard et al | 425/140 UX |
| 3,190,501 | 6/1965 | Lambert | 425/4 X |
| 3,342,913 | 9/1967 | Engel | 425/4 X |

FOREIGN PATENTS OR APPLICATIONS
1,154,561  6/1969  Great Britain.......................... 425/4

*Primary Examiner*—R. Spencer Annear
*Assistant Examiner*—Mark Osenbaum
*Attorney, Agent, or Firm*—Burgess, Dinklage & Sprung

[57] ABSTRACT

In the production of moulded articles wherein reactants are combined, react, and form the material, e.g. foam, composing the article, filling the mould, a mixing chamber for the reactants is combined with the mould. The reactants are introduced and mix in the mixing chamber and issue therefrom into the mould where they react for the formation of the article. In the reaction the mixing chamber can become integrated with the article. The mould can be a shell which becomes integrated with the material produced by the reaction, forming an outer skin of the article.

18 Claims, 18 Drawing Figures

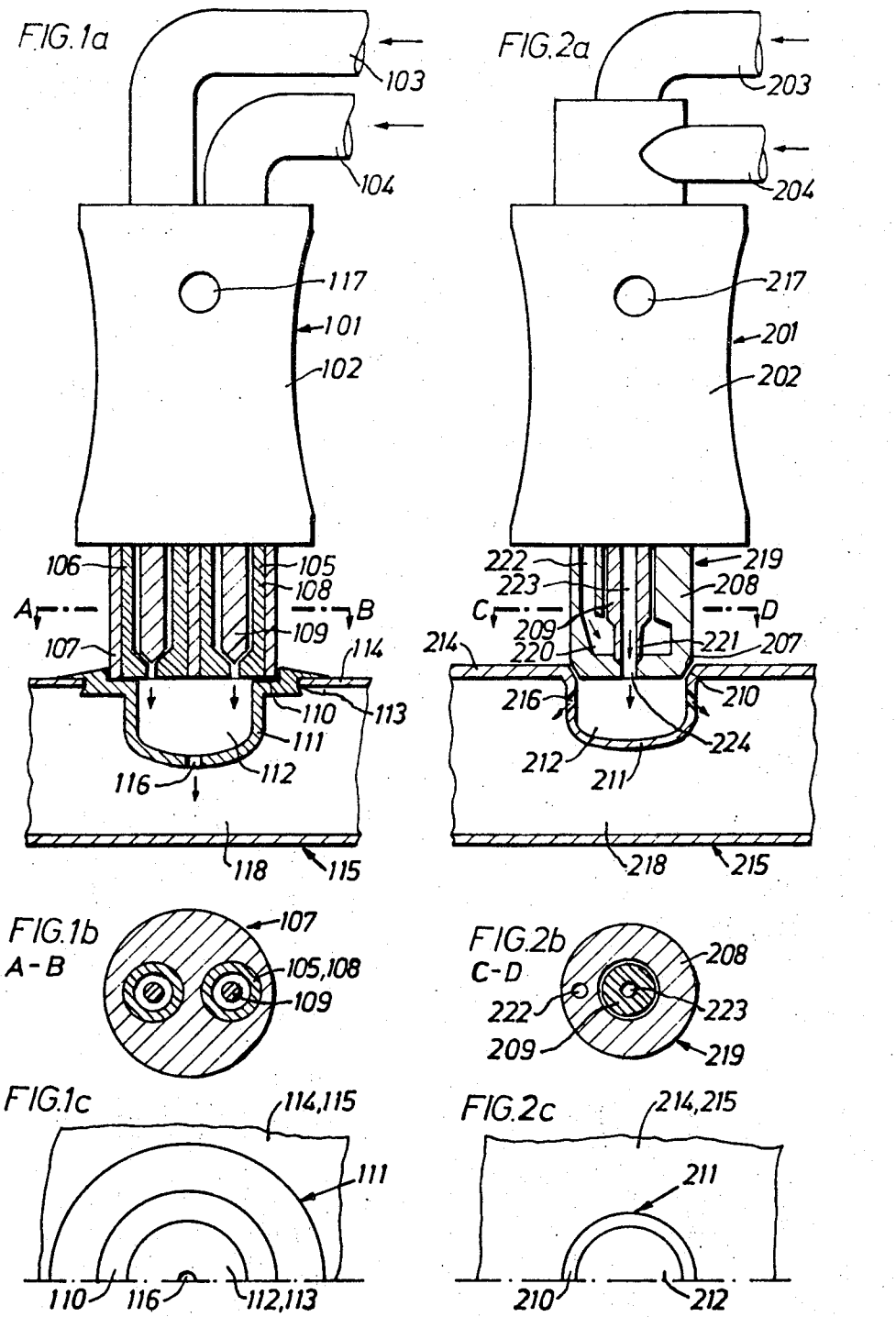

PATENTED FEB 26 1974  3,794,451
SHEET 2 OF 3
FIG. 3a
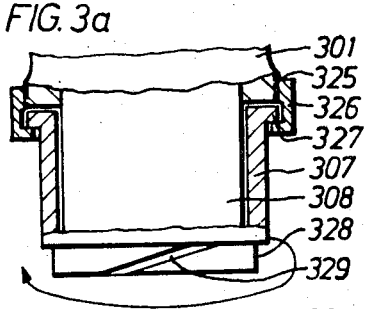
FIG. 3b
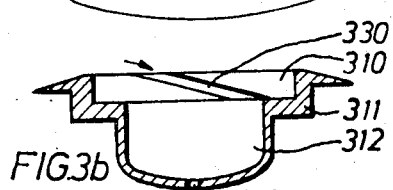
FIG. 3c
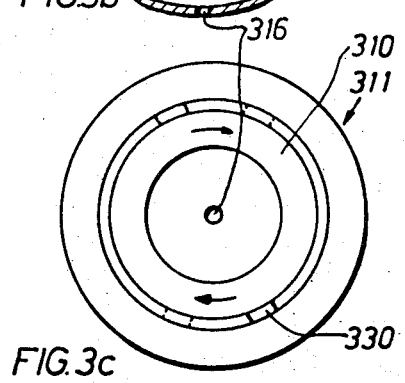
FIG. 4a
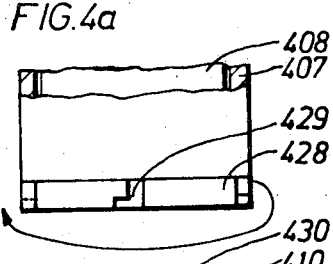
FIG. 4b
FIG. 4c
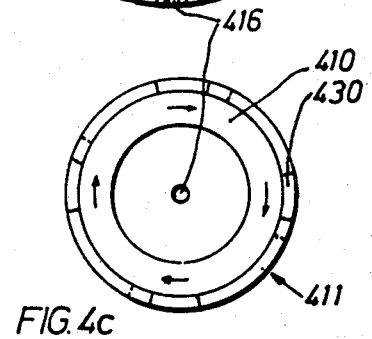
FIG. 5a
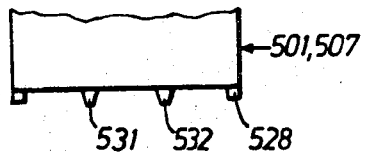
FIG. 5b
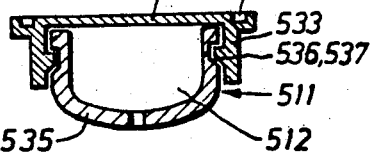
FIG. 6a
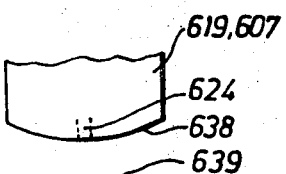
FIG. 6b / FIG. 6c
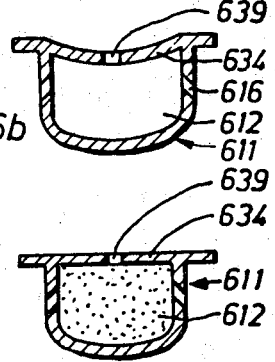
INVENTORS:
KARL BREER, KLAUS SCHULTE
BY: Burgess, Dinklage & Sprung

INTRODUCTION OF REACTANTS INTO MOULDS

BACKGROUND

This invention relates to moulding of material formed by reactants introduced into the mould, and is especially concerned with moulding of the polyurethane foam. Other materials which may be utilized in the practice of the invention are unsaturated polyesters, epoxide resins, epsilon caprolactam their copolymers.

It is generally known that devices for this service can be made in form of a mixing head which contains the mixing chamber, with inlet nozzles for the reactants being arranged in the walls of the mixing chamber.

The disadvantage of mixing heads such as these is that the mixing chamber has to be flushed out after used to prevent the bulking of foam which has already fully reacted in the mixing chamber. Air, one of the components, or a solvent is generally used as the flushing agent. In this way, losses of material are incurred or alternatively a separate means for supplying the air or the solvent required for flushing is required. Another disadvantage is that these flushing agents have to be collected by some means to prevent them from polluting the surroundings. A further disadvantage is the length of time required for flushing.

The object of the present invention is to provide a mixing chamber which does not have to be flushed out and for this reason is particularly suitable for filling with foam serieslike workpieces on the assemply-line principle, for example, hollow bodywork sections in the automobile industry.

THE INVENTION

According to the invention, this object is achieved by providing a mixing chamber which is arranged in the form of a so-called lost or dead mixing chamber in the wall of the mould or work-piece to be filled with foam, whilst the inlet openings of nozzles are combined to form part of a machine or gun having an adapter which corresponds with a centring element on the mixing chamber so that when the adapter is positioned on the centring element the mixing chamber is sealed off from the surroundings. In a preferred embodiment, the mixing chamber is not removed from the mould after the mixing, and becomes integrated with the moulded article in the process. Alternatively, the mixing chamber can be removed, and thrown away or cleaned for reuse.

In one particular embodiment of the invention, applicable in particular, when moulding or deep-drawing such workpieces which are to form the outer skin of the article, the lost mixing chamber is moulded or deep-drawn into the wall of the workpiece. This can be directly achieved during moulding, casting or deep-drawing of the workpiece.

Alternatively, it is proposed in accordance with the invention that the lost mixing chamber be in the form of an insert and fitted into a corresponding recess in the workpiece. This insert consists, for example, of an injection-moulded plastics or metal component. The recess in the workpiece for accommodating the insert can be obtained, for example, by drilling or punching or may even be formed during casting or deep-drawing providing this is permitted by the tolerances and providing the workpiece is produced by casting or deep-drawing.

In one particularly advantageous embodiment of the invention, the mixing chamber is sealed off from tye outside by a cover closure or cover plate. This has the particular advantage that the workpiece has a smooth or at least an attractive surface. The coverplate is preferably designed so that it can be punctured.

According to one particular proposal, therefore, the outlet openings or nozzles of the gun have injection-needle like orifices by which the cover plate can be punctured.

In an alternative embodiment, the cover plate has at least one hole drilled through it. In this case, he bore hole is arranged so that when the outlet openings or nozzles of the gun are in position they spray the components into the mixing chamber through the bore hole or holes. The cover plate preferably consists of elastic material. The advantage of this is that the gun is able to cling to the wall of the orifice, forming a seal, so that the components cannot be sprayed sideways.

The outer surface of the cover plate preferably deepens towards the centre. In this way, the foaming mixture left in the mixing chamber, on account of its tendency to expand, fills the entire space available and arches the cover plate outwards so that, in the final state, the cover plate forms a substantially conforming or flat surface with the surface of the workpiece. The end faces of the gun outlet or nozzle are preferably designed to correspond to the outer contour of the cover plate. When using an injection needle-like orifice and a bore hole in the cover plate, said orifice may represent an adapter and said bore hole may represent the centering element.

In another particularly advantageous embodiment of the invention, the outlet openings or nozzles consist of concentrically arranged openings or nozzles (two-component nozzles). The advantage of this is that the two components are sprayed concentrically into the mixing chamber so that only one bore hole or incision is required where cover plates are used, which contributes toward the subsequent uniformity of the surface of the workpiece.

To prevent the components or the mixture from leaking between the mixing chamber and the outlet end of the gun or adapter, the said outlet end or adapter and the mixing chamber, in another particular embodiment of the invention, are designed to be connectable by coupling elements corresponding to one another during introduction of the mixture. The coupling elements are preferably in the form of helical slots with corresponding helical flanges which provide for a tongue and groove coupling. One of these elements is arranged on an adapter on the end of the gun barrel, and the other on the mixing chamber. By turning the helical flanges into the helical slots, the link is established for the time it takes to introduce the mixture. Alternatively, arresting holes are provided as the coupling elements on the centring element of the mixing chamber, whilst arresting hooks corresponding to the arresting holes are arranged on the adapter of the outlet openings or nozzles so that a bayonet joint is provided. In this arrangement, the arresting hooks are shaped into the slightly larger or slot-like arresting holes, and the adapter turned slightly until the arresting hooks engage below the mixing chamber wall.

So that the entire assembly composed of outlet openings or nozzles and delivery pipes do not have to be turned by hand, or in the case of relatively large automatic machines, according to the invention, the adapter on the end of the gun barrel is preferably mounted to rotate about its central axis. The bearing for the adapter in this case is arranged on that part of the gun which carries the openings or nozzles or on the opening wall or nozzle wall itself.

Depending on how the inlet openings or nozzles are arranged, it is of advantage to provide the mixing chamber with a central outlet opening or with one or more eccentric outlet openings. In cases where the orifices of the mixing chamber inlet openings or are arranged as known per se eccentrically of the central axis of the mixing chamber, a central outlet opening in the mixing chamber seems to be of advantage. In another case, for example in cases where concentrically arranged mixing chamber inlet openings or nozzles are used which preferably open in the central axis of the mixing chamber, one or more outlet openings should be eccentrically arranged. Thus, the outlet opening of the mixing chamber is offset from the path of the reactants into the mixing chamber.

In one particular embodiment, the mixing chamber can be mounted on the adapter of the gun and fitted into a recess the workpiece by the adapter. This manipulation simplifies procedure very considerably and is also easy to achieve by arranging on the adapter positioning pins which can be inserted into corresponding holes in the insert so that the lost mixing chamber, once in position, is held in place. At the same time these locating pins and holes are used to centre the mixing chamber relative to the adapter. The gun with its adapter and the mixing chamber mounted on it in one piece can then readily be pressed by hand into a recess arranged in the wall of the workpiece to be filled with foam.

Thus, the invention provides a process of moulding articles wherein reactants are combined, react, the form the material composing the article filling mould to effect the moulding. The process comprises the step of combining with the mould a container to serve as a mixing chamber for the reactants. The mixing chamber has an outlet opening for discharge of the reactants which are mixed therein, into the mould. The reactants are introduced into the mixing chamber, mixed therein, and are discharged into the mould. The reactants are then allowed to react in the mould for formation of the article, and integration of the mixing chamber with the article.

Some of the reactants may remain in the mixing chamber and react therein. Where the product of the reaction is a foam, the foam can fill the mixing chamber.

A closure for the mixing chamber can be provided. The closure can serve to shape the foam or other product formed from the reactants in the mixing chamber to conform with the shape of the article produced. The closure is maintained on the mixing chamber during the reaction. The mixing chamber can have an open top, and the reactants can be supplied to the mixing chamber with a gun having a delivery barrel, contoured to serve as the closure. The gun can be secured in place on the mixing chamber in various ways. Hand pressure can be relied on. The closure can be a cover for the mixing chamber which is deformable under the reaction pressure, and can be initially shaped so that the forming pressure deforms it from the initial shape to provide conformation of the closure with the shape of the article produced.

The mould can be a shell which becomes integrated with the foam forming the outer surface of the article produced.

The apparatus comprises the mould, which, as noted above, can be a shell which is to form an outer skin of the article produced, a gun for delivery of reactants to the mould having a discharge barrel for discharge of the reactants into the mixing chamber, and the mixing chamber assembled with the mould.

The mixing chamber can be formed as one piece with at least part of the mould (FIG. 2a). Alternately, the moulding chamber can be an insert installed in an opening in the mould (FIG. 1a).

EMBODIMENTS

Various embodiments of the device according to the invention are described in the following with reference to the accompanying drawings, wherein:

FIG. 1a is a partial longitudinal section through a first embodiment,

FIG. 1b is a section on the line A-B of FIG. 1a,

FIG. 1c is a plan view of the mixing chamber shown in FIG. 1a.

FIG. 2a is a partial longitudinal section through another embodiment of the device.

FIG. 2b is a section on the line C-D of FIG. 2a.

FIG. 2c is a plan view of the mixing chamber shown in FIG. 2a.

FIG. 3a is a partial longitudinal section through a first embodiment of the adapter with coupling elements.

FIG. 3b is a longitudinal section through a mixing chamber with corresponding coupling elements.

FIG. 3c is a plan view of the mixing chamber shown in FIG. 3b.

FIG. 4a is a partial longitudinal section through a second embodiment of the adapter with coupling elements.

FIG. 4b is a longitudinal section through a mixing chamber with corresponding coupling elements.

FIG. 4c is a plan view of the mixing chamber shown in FIG. 4b.

FIG. 5a is a side elevation of a device with injection needle-like orifices of the inlet nozzles. FIG. 5b is a longitudinal section through a mixing chamber corresponding with the device shown in FIG. 5a.

FIG. 6a is a side elevation of one particular embodiment of the adapter.

FIG. 6b is a longitudinal section through a mixing chamber corresponding with the adapter shown in FIG. 6a in the unfilled state.

FIG. 6c is a longitudinal section through a mixing chamber of the kind shown in FIG. 6b in the filled state.

FIG. 7 illustrates the functional construction of a gun such as is shown in FIG. 2a.

In FIGS. 1a–6c, the reference numbers are in three digits, the first digit (hundreds) being the same as the FIG. No., the second and third digits are the numbers of structural parts with like part numbers in different figures indicating corresponding parts.

Figure 7:
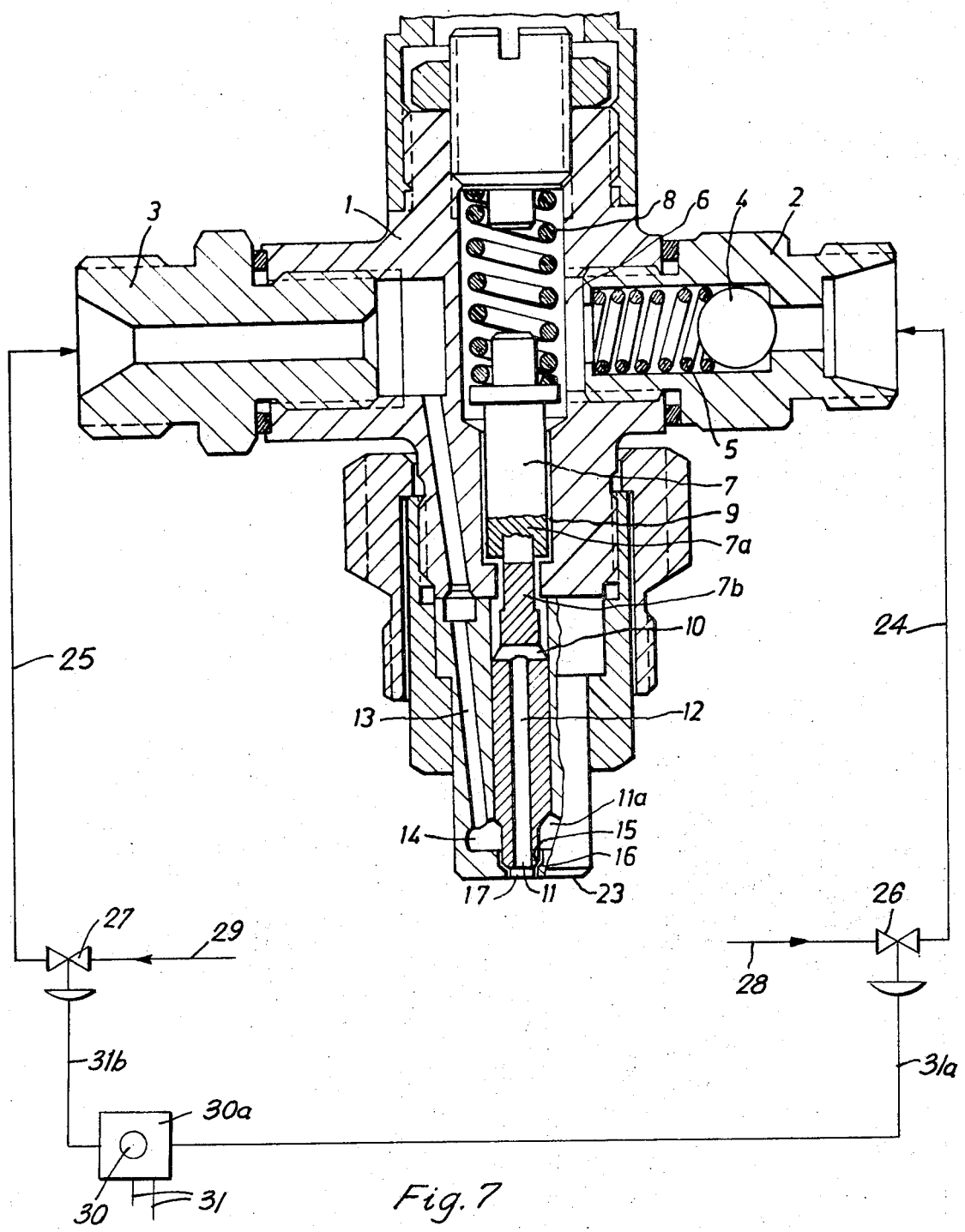

In FIGS. 1a, 1b and 1c, the gun 101 comprises a handle 102, the delivery pipes 103 and 104 for the reactive components and the gun barrel composed of the nozzles 105 and 106 and an adapter 107. The nozzles 105 and 106 each consist of a casing 108 ane needle 109. The adapter 107 is placed on the centring element 110 of a mixing chamber 111 and seals off the mixing chamber compartment 112 from the outside. The mixing chamber 111 is pressed into a recess 113 formed in the wall 114 of the workpiece 115 as a snap fit. The workpiece 115 is a shell which is to form the outer skin of the article. The mixing chamber is a plastic injection moulding and has a central outlet opening 116. The mixing chamber is cylindrical in horizontal cross section as can be seen in FIG. 1c. The diameter can be about 0.5 to 2 cm, and the depth to the inside of the outlet opening 116 can be about 0.5 to 2 cm. The volume of the mixing chamber can be about 0.1 to 6 cm$^3$. The gun is actuated by a pushbutton switch 117. The components introduced through the nozzles 105 and 106 are mixed together in the mixing chamber 111 to form a reactive mixture. This mixture leaves the mixing chamber compartment 112 in the form of a liquid through the outlet opening 116 and flows into the cavity 118 in the workpiece 115 to be filled with foam. Here the mixture expands, completely filling the cavity 118. A residue of mixture is left behind in the mixing chamber compartment 112 and reacts to completion therein. If highly reactive components have been used, the end face of the adapter 107 or the nozzle 105, 106 simultaneously forms the mould wall for the mixture residue foaming in the mixture chamber compartment 112. In the case of slowly reacting components, the gun 101 together with the adapter 107 can be removed when the residue of mixture expands in the mixing chamber compartment 12. In this case, the residue expands beyond the edge of the mixing chamber 111 and can readily be trimmed flat to the surface of the workpiece 115 by means of a blade.

In FIGS. 2a, 2b, and 2c, the gun 201 comprises a handle 202, delivery pipes 203 and 204 and a two-component discharge nozzle 219. The nozzle 219 consists of the casing 208, and a needle 209 with a hole 223 drilled through its centre, and of an annular duct 220 which surrounds the tapering end 221 of the needle 209 and communicates through a bore 222 with the delivery pipe 203, whilst the bore 223 in the needle 209 communicates with the delivery pipe 204. The mixing chamber 211 is moulded into the wall 214 of the workpiece 215 and has a conical centring element 210 which corresponds with the adapter 207 which in this case is directly combined with the barrel or nozzle casing 208.

Since the nozzle orifice 224 is arranged in the central axis of the mixing chamber 211, the outlet openings 216 are arranged in the side wall of the mixing chamber 211. The gun is actuated by means of a push-button switch 217. The passageways 222 and 223 are concentrically arranged adjacent the discharge 224 of the gun barrel The mode of operation and also the filling cycle are substantially the same as described with reference to FIG. 1.

In FIG. 3a, the gun 301 is outfitted with a screw thread 325 on to which is screwed a retaining nut 326 in which an adapter 307, which is an outer sleeve on the gun barrel 308, is rotatably mounted in the recess 327. The retaining nut 326 is rotatable about the nozzle casing 308 and at its lower end has a shoulder 328 on whose peripheral surface helical blades 329 are arranged. The adaptor 307 serves as half coupling and can be inserted into the mixing chamber 311 shown in FIGS. 3b and 3c by turning the adapter 307 so that the helical blades 329 engage in the helical slots 330, which serve as a complimenting half coupling. The shoulder 328 of the adapter 307 is drawn into the centring element 310 by operation of the helical tongue and groove coupling, and seals off the mixing chamber compartment 312 from outside. The outlet opening of the mixing chamber is denoted by the reference 316.

In FIG. 4a, the device part is also provided with a thread on to which is screwed a retaining nut which holds the adapter 407 in the recess in such a way that it can rotate about the nozzle casing just as shown in FIG. 3a. In this embodiment, a coupling employing a bayonet joint is provided. At the lower end of the adaptor 407 there is a shoulder 428 which has bolt or arresting hooks 429 around its periphery. These arresting hooks 429 can be inserted into the catches or arresting holes 430 of the mixing chamber 411 shown in FIGS. 4b and 4c. In this way, the mixing chamber compartment 412 is sealed off from the outside. The mixture leaves the mixing chamber 411 through the outlet 416. The arresting holes 430 are arranged in a centring element 410 which corresponds with the shoulder 428 of the adapter 407.

In FIG. 5a, the end face of the adapter 507, or of the discharge nozzles (not shown in FIG. 5a) has injection needle-like openings or orifices 531 and 532. In addition locating pins 528 are provided on this end face. The locating pins in holes 510 formed in the mixing chamber 511 shown in FIG. 5b. This mixing chamber 511 consists of two individual injection-mouldings, one of which consists of a ring 533 which has a closure or cover plate 534 in which the locating holes 510 are positioned. The second part 535 of the mixing chamber surrounds the actual mixing chamber compartment 512 and is connected to the part 533 through a tongue and groove joint 537, 536. When the gun 501 (FIG. 5a) is firmly in position on the mixing chamber 511, the injection needle-like orifices 531 and 532 of the gun discharge nozzles puncture the coverplate 534 so that the components can be sprayed into the mixing chamber compartment 512.

The cover plate 534 seals off the mixing chamber compartment 512 from the outside.

FIG. 6a shows a two-co mponent inlet nozzle 619 whose orifice simultaneously acts as the adapter 607. The end face 638 of the two-component nozzle 619 is curved and hence fits into the recess provided by deformation of closure 634 of mixing chamber 611 shown in FIG. 6b. The cover plate 634 is dished and deepens toward the spray hole 639. This spray hole 639 is arranged in the central axis of the mixing chamber 611 and can be registered with the central nozzle orifice 624. Outlet openings 616 are provided in the side wall of the mixing chamber to ensure that the components sprayed in are throughly mixed with one another before leaving the mixing chamber compartment 612. The mixing chamber 611 shown in FIG. 6b is shown filled with foam in FIG. 6c. The residue of mixture left in the mixing chamber compartment 612 has reacted in it and the foaming pressure has arched the elastic cover plate 634 upwards so that it forms a flat surface with the surface of the workpiece (not shown) or otherwise conforms with that surface. The cover plate 634 is deliberately made of an elastic material that will bend in view of the foaming pressure to be expected, thus ensuring the flat or conformed surface after the residue of mixture has reacted to completion in the mixing chamber compartment 612. The foam issuing from the spray hole 639 can readily be cut off by means of a blade.

The functional construction and operation of a gun such as is shown in FIG. 2a is illustrated in detail in FIG. 7. Sockets 2 and 3 for the components are arranged in the housing 1. A ball valve 4 loaded by a spring 5 is provided in the socket 2. The first component flows through this valve 4 into the interior 6 of the housing where a nozzle needle 7, composed of upper part 7a and lower part 7b, is under the closing pressure of the spring 8. Part of the shaft of the nozzle needle 7 is surrounded by an annular gap 9 at the end of which the nozzle needle 7 has radial bores 10. From the orifice 11 of the nozzle needle 7, a central bore 12 extends up to the radial bores 10 so that the component can flow out of the interior 6 of the housing through the annular gap 9, the radial bores 10 and the central bore 12. Branching off from the socket 3 for the second component there is a bore 13 which opens into an annular duct 14 surrounding the end of the nozzle needle 7 when the nozzle is inoperative. The nozzle needle 7 has a sealing surface 15 which when the nozzle is closed rest against a counter surface 16, forming a seal. In the vicinity of and below the annular duct 14 the end of the nozzle needle 7 is smaller in diameter than the rest of the nozzle shaft. In this way the nozzle needle 7 is raised when the second component is placed under pressure, which acts on shoulder 11a of the needle nozzle, whilst at the same time the ball valve 4 is opened when the first component is placed under pressure. Thus, the first component can flow through the central bore 12 of the nozzle needle 7 and the second component through the bore 13 and the annular duct 14 to the gun nozzle orifice 17 through which they are ejected.

When the apparatus is placed on the mixing chamber shown in FIG. 2a which is fitted into the wall of a workpiece (which can be a wall of a mould or the part of a shell which is to form outer skin of the article produced), the end face 23 of the gun (FIG. 7), by resting on the shoulder 210 (FIG. 2a) seals both parts from the surrounding in which the moulding is performed. The mixture is thoroughly whirled around in the mixing chamber 212 and after a short residence time leaves it through the outlet openings 216 and flows into the space to be filled with foam.

One component is supplied to socket 2 (FIG. 7) via line 24 which is outfitted with an on-off control valve 26, to which is connected supply line 28, which communicates with a source (not shown) of said one component at a constant pressure. The other component is supplied to socket 3 via line 25 which is fitted with on off control valve 27, to which is connected supply pipe 29, which communicates with a source of said other component at a constant pressure. Control unit 30a having power supply lines 31 is pneumatically or electrically connected with the control valves 26 and 27, respectively, via lines 31a and 31b.

In operation, the finger switch 30 is depressed and immediately released. This simultaneously causes valves 26 and 27 to open and starts a time delay mechanism (not shown) in control unit 30a. The valves remain open during the operating period of the timing unit and the timing unit then operates to automatically cause the valves 26 and 27 to close. During the said operating period, the gun is held in place on a mixing chamber and components flow into the mixing chamber from the outlet orifice 17.

The components, which are in liquid state, in lines 28 and 29 can be, and preferably are, under the same pressure, so that mixing does not occur due to release of pressure before the stream of the two components leaves the orifice 17.

The injection pressures of the components are in the range of 4 to 1,000 atmospheres, preferably from 50 to 400 atmospheres. If the components are injected with different pressure, the component under high pressure is introduced through conduit 220 (FIG. 1).

What is claimed is:

1. Apparatus suitable for production of composite articles having an outer skin filled with material moulded therein which comprises:
    a. a hollow shell to form the outer skin providing a cavity for moulding of said material within the shell;
    b. a gun for delivery of a plurality of separate components to the hollow shell having a discharge barrel for discharge of the components into the hollow shell for the moulding; and
    c. a mixing chamber assembled with the hollow shell for integration with the articles, said mixing chamber being disposed so as to extend from the surface of said shell into its cavity and being joined to the hollow shell and being shaped to cooperate with said gun so as to seal said chamber off from the surroundings and having an outlet opening for discharge of the components after mixing thereof in the mixing chamber, into the cavity for formation of the article.

2. Apparatus according to claim 1, the mixing chamber being formed as one piece with at least part of the mould.

3. Apparatus according to claim 1, the mixing chamber being an insert installed in an opening in the mould.

4. Apparatus according to claim 1, the mixing chamber having a closure closing the inlet end thereof for receiving the discharge end of said discharge barrel.

5. Apparatus according to claim 4, the discharge barrel of the gun having means for piercing the closure for forming openings therein for passage of the components into the mixing chamber.

6. Apparatus according to claim 1, the mixing chamber having a closure having an opening therein for registering with the discharge barrel of the gun for passage of the compounds through said opening into the mixing chamber.

7. Apparatus according to claim 1, the mixing chamber having a closure closing the inlet end thereof, said closure being deformable by pressure, the closure being dished so that upon deformation by pressure within the mixing chamber it is deformed for conforming thereof with the shape of the article produced.

8. Apparatus according to claim 1, the gun having two passageways for respective component, said two passageways being concentrically arranged, adjacent the discharge of the gun barrel.

9. Apparatus according to claim 1, the gun having a half coupling, the mixing chamber having a half coupling, said couplings being interengagable to secure the gun in place in the mould.

10. Apparatus according to claim 9, the half couplings comprising a cooperating tongue and groove for said interengagement.

11. Apparatus according to claim 9, the half couplings comprising cooperating bolts and catches of a bayonet joint for said interengagement.

12. Apparatus according to claim 9, the gun barrel being outfitted with an outer sleeve rotatable about the axis of the barrel, said half coupling of gun being mounted on said sleeve, said interengagement being effected by aligning the half couplings and rotating the sleeve.

13. Apparatus according to claim 9, said opening of the mixing chamber being offset from the path of the reactants into the mixing chamber from the gun.

14. Apparatus according to claim 3, the insert being installed on the mould by snap fit.

15. Apparatus according to claim 1, the mixing chamber having an elastic closure closing the inlet end thereof.

16. Apparatus suitable for moulding of articles wherein components are combined and form the material composing the article filling the mould which comprises:
   a. the mould;
   b. a gun for delivery of the components to the mould, having a discharge barrel for discharge of the components for the moulding;
   c. a mixing chamber assembled with the mould adapted to receive the components from the gun and having an outlet opening for discharge of the components after mixing thereof in the mixing chamber, into the mould for formation of the article;
   d. the mixing chamber having a closure closing the inlet end thereof;
   e. the discharge barrel of the gun having means for piercing the closure for forming openings therein for passage of the components into the mixing chamber.

17. Apparatus suitable for moulding of articles wherein components are combined, and form the material composing the article filling the mould which comprises:
   a. the mould;
   b. a gun for delivery of the components to the mould, having a discharge barrel for discharge of the components for the moulding;
   c. a mixing chamber assembled with the mould adapted to receive the components from the gun and having an outlet opening for discharge of the components after mixing thereof in the mixing chamber, into the mould for formation of the article, the mixing chamber having a closure closing the inlet end thereof, said closure being deformable by pressure, the closure being dished so that upon deformation by pressure within the mixing chamber it is deformed for conforming thereof with the shape of the article produced.

18. Apparatus according to claim 1, the mixing chamber being a stirrerless mixing chamber.

* * * * *